Figure 1:
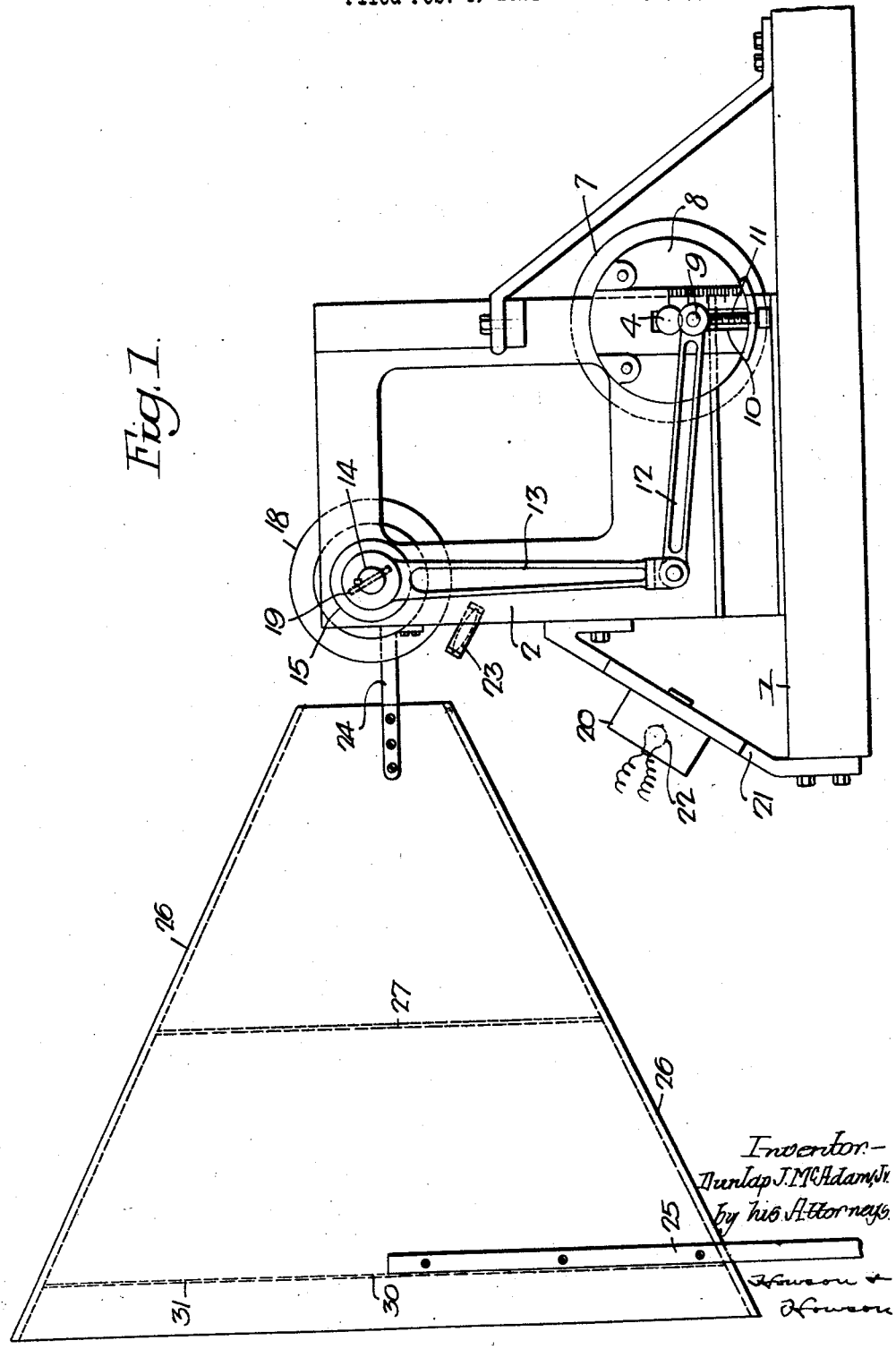

Feb. 21, 1928.

D. J. McADAM, JR 1,660,270

TESTING MACHINE

Filed Feb. 4, 1921

2 Sheets-Sheet 2

Fig. 2.

Inventor-
Dunlap J. McAdam, Jr.
by his Attorneys
Howson & Howson

Patented Feb. 21, 1928.

1,660,270

UNITED STATES PATENT OFFICE.

DUNLAP J. McADAM, JR., OF ANNAPOLIS, MARYLAND, ASSIGNOR TO TINIUS OLSEN TESTING MACHINE COMPANY, OF PHILADELPHIA, PENNSYLVANIA, A CORPORATION OF PENNSYLVANIA.

TESTING MACHINE.

Application filed February 4, 1921. Serial No. 442,480.

This invention relates to that class of machines particularly designed for subjecting a test specimen to alternating torsional stresses and one object thereof is to provide a relatively simple and substantial device of such design and construction as to permit of a highly accurate determination of the stress applied to such specimen.

It is further desired to provide a testing machine of the above general type which shall employ or utilize an oscillatory fly wheel as part of its stress applying means and shall include means adjustable to cause said wheel to oscillate through any desired angle.

Another object of my invention is to provide a novel device for accurately measuring the angle of oscillation of an oscillatory member such as a fly wheel forming part of the stress applying mechanism of a testing machine, together with novel means for adjusting such angle at will to vary the stresses applied to a test specimen.

Figure 2:
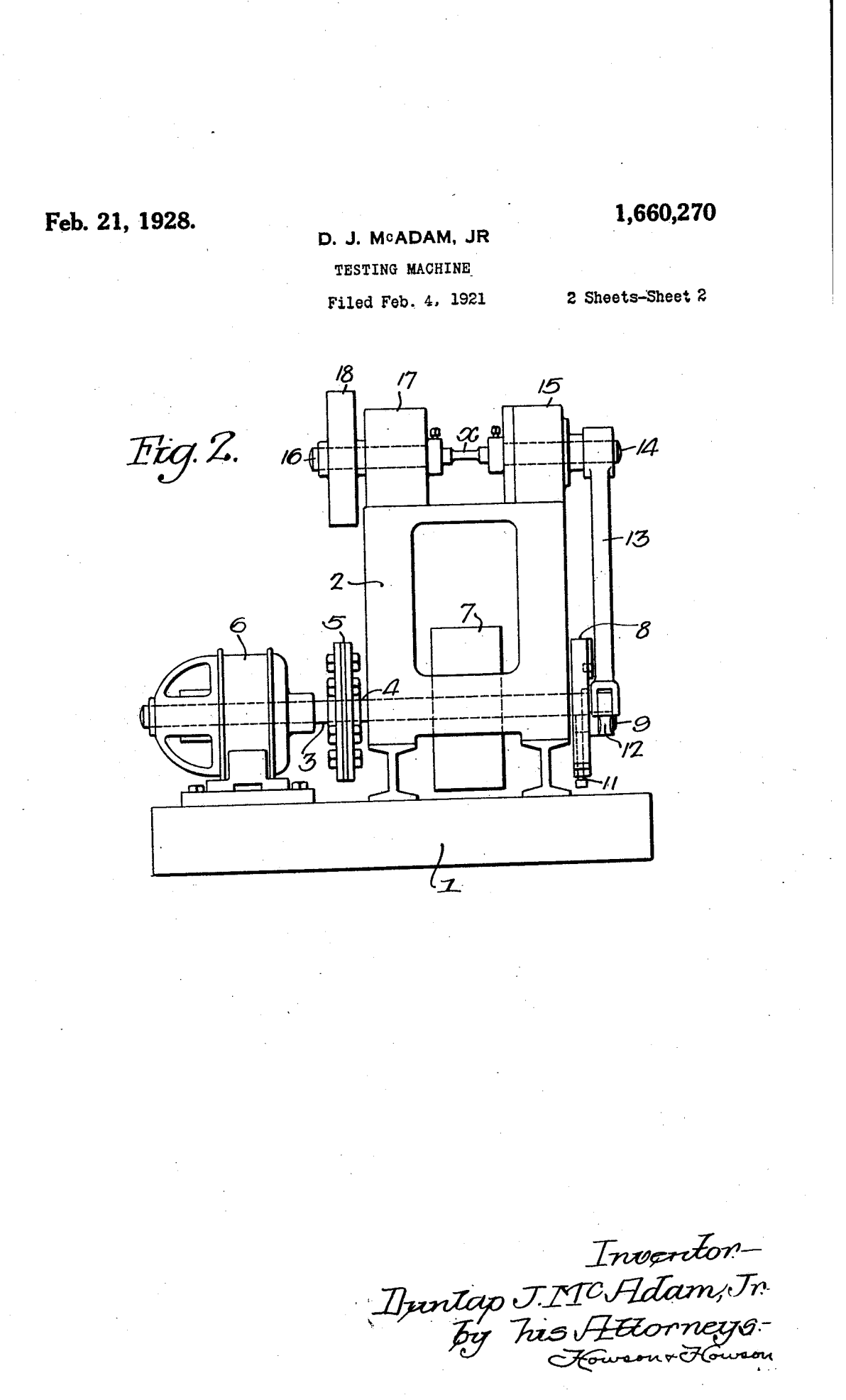

These objects and other advantageous ends I attain as hereinafter set forth, reference being had to the accompanying drawings, in which, Fig. 1 is an end elevation of a machine constructed in accordance with my invention; and Fig. 2 is a side elevation of the machine shown in Fig. 1, with the scale and hood omitted.

In the above drawings, 1 represents a suitable base or supporting structure on which is mounted a frame 2 providing bearings for a horizontal shaft made in two sections 3—4 connected by a flexible coupling 5, the first section either as in the present instance constituting the armature shaft of a driving motor 6 or being suitably coupled to some other source of power. The section 4 of said shaft has fixed to it a relatively heavy fly wheel 7 and a crank disc 8 and the latter has mounted in it an adjustable crank pin 9, carried upon a block slidably mounted in a radial slot 10 where it is adjustable radially of the disk by means of a suitably mounted screw 11, thus permitting the throw or eccentricity of the pin 9 to be varied at will.

Through a link 12 the pin 9 is connected to the lower end of an arm 13 whose upper end is fixed to a short shaft 14 mounted in an anti-friction bearing 15 preferably though not necessarily carried on the upper part of the frame 2, in line with a second short shaft 16 mounted in a similar anti-friction bearing 17. The adjacent ends of said two shafts 14 and 16 are suitably formed to provide or have mounted on them chucks or holders for a test specimen $x$ and the shaft 16 has fixed to it a fly wheel 18.

The outer or free end of the shaft 16 on which the fly wheel 18 is carried has mounted on it a mirror 19 positioned to receive a beam of light from a light tube 20 mounted on a member 21 which braces the frame 2 to the base 1, and said tube consists of a closed container having within it a source of light such as an incandescent lamp 22. The tube has formed in it a suitably placed, elongated slit through which the light from said source may be projected toward the mirror 19 in the form of a narrow beam and a double convex lens 23 is suitably mounted on the frame 2 in the line of the beam from the light tube 20 so as to concentrate the same upon the mirror.

Suitably mounted adjacent the above described apparatus and in the present instance carried partly from a bar 24 projecting from the frame 2 and partly from the vertical support 25, is a suitable hood 26 in the form of a square prismatic or conical structure having mounted within it a scale 27 upon which the mirror 19 may reflect the beam of light from the light tube 20.

Under conditions of operation the motor 6 turns the shaft 3—4,—in a typical case at a speed of 1200 revolutions per minute—and the resulting rotation of the crank disc 8 with its pin causes the arm 13 with the shaft 14 to be oscillated. If a test specimen $x$ be connected between said shaft and the shaft 16, the inertia of the fly wheel 18 causes alternating torsional stresses to be applied to said specimen, as the two shafts 14 and 16 are alternately oscillated in opposite directions. The maximum torsional moment thus produced is proportional to the moment of inertia of the fly wheel 18, to the maximum angular rotation of said wheel and to the square of the frequency of its oscillation.

The torsional moment T in absolute units may be calculated from the formula:

$$(1) \quad T = \frac{4\pi^2 I\Theta}{t^2}$$

In this formula I represents the moment of inertia, $\Theta$ represents the amplitude of oscillation of the fly wheel 18 (in radians) and $t$ represents the time in seconds required for one revolution of the shaft 3—4. Since the numerical value of the torsional moment expressed in pound-inches is the fraction 1/384th of that expressed in the corresponding absolute units, this value denoted by T′ must be obtained from the formula:

$$(2) \quad T_1 = \frac{\pi^2 I\Theta}{96 t^2}$$

To obtain a formula for calculating the maximum stress in the specimen $x$, use must be made of a formula expressing the relation between the torsional moment and the maximum stress produced in a cylindrical specimen, as follows:

$$(3) \quad T_1 = \frac{\pi S d^3}{16}$$

in which S represents the stress in pounds per square inch and $d$ represents the diameter of the specimen in inches.

Combining formulas (2) and (3), there is obtained $$(4) \quad S = \frac{\pi I\Theta}{6 t^2 d^3}$$

If the amplitude of oscillation of the fly wheel 18 or any equivalent structure whose mass is uniformly distributed about its axis of oscillation, is expressed in degrees with the designation $\Theta$, and the constants are combined, there is obtained a formula:

$$(5) \quad S = \frac{0.00916 I\Theta}{t^2 d^3}$$

In a machine which I have successfully employed, the moment of inertia of the fly wheel was 142 pound-inches and the specimen operated on was 0.5 inches in diameter. For this machine and specimen therefore the constants when combined gave the formula:

$$(6) \quad S = 0.002888 \phi \overline{RPM}^2$$

The accuracy of the stress measurements therefore depends on the measurement of the angle $\phi$ and in the machine above described this angle was accurately measured by noting the amount of movement of the beam of light reflected from the mirror 19 upon the scale 27 which was translucent.

The light tube 20, the lens 23 and said scale were so related that the image of the narrow slit in the upper end of said light tube extended horizontally on said scale. Consequently when the fly wheel 18 was oscillated through an angle of 2 $\phi$ the reflected beam of light oscillated through an angle of 4 $\phi$, thus producing a band of light upon the scale whose width depended on the distances of the tube 20, the lens 23 and the scale 27 from the mirror;—there being provided a vertical slit in the member 31 enclosing the large end of the hood for the purpose of observing the light image formed on the screen 27.

With the above described arrangement the scale 27 may be placed at such a distance from the mirror 19 that the annular measurement required may be made with a high degree of accuracy and in the machine operated by me one-fourth the width of the light band in centimeters is a measure of the value of the angle $\phi$ in degrees, the error in angular measurement and consequently the error in stress measurement being not more than about one per cent. Any desired and suitable device may be employed for maintaining constant the speed of the electric motor throughout the test.

By means of the above described machine a test specimen of a suitable size, after being clamped in the chucks or holders provided on the adjacent ends of the shaft sections 14 and 16, may have applied to it alternating torsional stresses until it fails and the amount of such stresses may be accurately determined by the scale measurement above described and the solution of the stress formula above given.

I claim:

1. The combination in a testing machine of two rotatably mounted members respectively engaging a test specimen; means for oscillating one of said members; and a body having its mass uniformly disposed about its axis of oscillation, connected to the other member to oppose, by its inertia, oscillation of the first member, said means including a member having a fly-wheel effect.

2. The combination in a testing machine of two rotatably mounted members respectively engaging a test specimen; means for oscillating one of said members including an arm and link, the latter having an adjustable mounting; and a fly wheel connected to the second member.

3. The combination in a testing machine of two aligned rotatable shafts; operating means connected to one of the shafts including an arm and link; and a fly wheel connected to the other shaft.

4. The combination in a testing machine of two shafts rotatably mounted in the same line; an arm connected to one of said shafts; a fly wheel connected to the other shaft; and means for oscillating said arm including a device for adjusting the angle of oscillation at will.

5. The combination in a testing machine of two members respectively engaging a test specimen; a radial adjustable crank connected to one of said members; a fly wheel connected to the other member to oppose alternating torsional force to oscillation of the test specimen; with means for rotating the crank to operate the member connected thereto.

6. The combination in a testing machine of two rotatably mounted members respectively engaging a test specimen; an arm connected to one of said members; a fly wheel connected to the other member; a motor driven crank; and a link connecting said crank with said arm.

7. The combination in a testing machine of two rotatably mounted members respectively engaging a test specimen; an arm connected to one of said members; a fly wheel connected to the other member; a motor driven crank; a link connecting said crank with said arm; and means for adjusting at will the angle of oscillation of the arm.

8. The combination in a testing machine of two rotatably mounted member respectively engaging a test specimen; means for oscillating one of said members; a fly wheel connected to the second member; and means for measuring the angle of oscillation of the fly wheel.

9. The combination in a testing machine of two rotatably mounted members respectively engaging a test specimen; means for oscillating one of said members; a fly wheel connected to the second member; and means for measuring the angle of oscillation of the fly wheel, consisting of a source of light, a scale, and a mirror movable with the fly wheel for directing light from said source adjacent said scale.

10. In a testing machine, the combination with an oscillatory body, the mass of which is uniformly disposed about its axis of oscillation; of means adapted to connect a specimen with said body; means for oscillating said specimen about an axis concentric with that of said body; and means for indicating the angle of oscillation of said body.

11. In a testing machine, the combination with a fly-wheel; of means adapted to operatively connect a test specimen to said fly-wheel; means for actuating said test specimen about an axis concentric with that of said fly-wheel, whereby the specimen may be stressed; and means for indicating the resulting movement of the test specimen.

12. In a testing machine, the combination with two rotatably mounted members adapted to engage a test specimen; of a fly-wheel connected to one of said members; means for oscillating the other of said members, so that said specimen may oscillate about an axis concentric with that of said fly-wheel; and a mirror movable with said fly wheel, whereby the angle of oscillation of said fly wheel may be ascertained.

13. In combination, a fly-wheel; means adapted to connect a specimen to said fly-wheel; means for oscillating said specimen about an axis concentric with that of said fly-wheel; means for measuring the angle of oscillation of said fly-wheel including a mirror movable with said specimen; and a lens and scale in operative relation to said mirror.

14. In combination, a supporting means for a test specimen; a fly-wheel operatively associated with said supporting means; means for oscillating said specimen; a source of light; a lens; a mirror movable with said fly-wheel for reflecting the light passing through said lens; a scale for receiving the reflected light; and a hood for enclosing said scale.

DUNLAP J. McADAM, Jr.